Oct. 7, 1958   D. C. PORTER   2,854,829
UNIVERSAL JOINT
Filed July 15, 1957
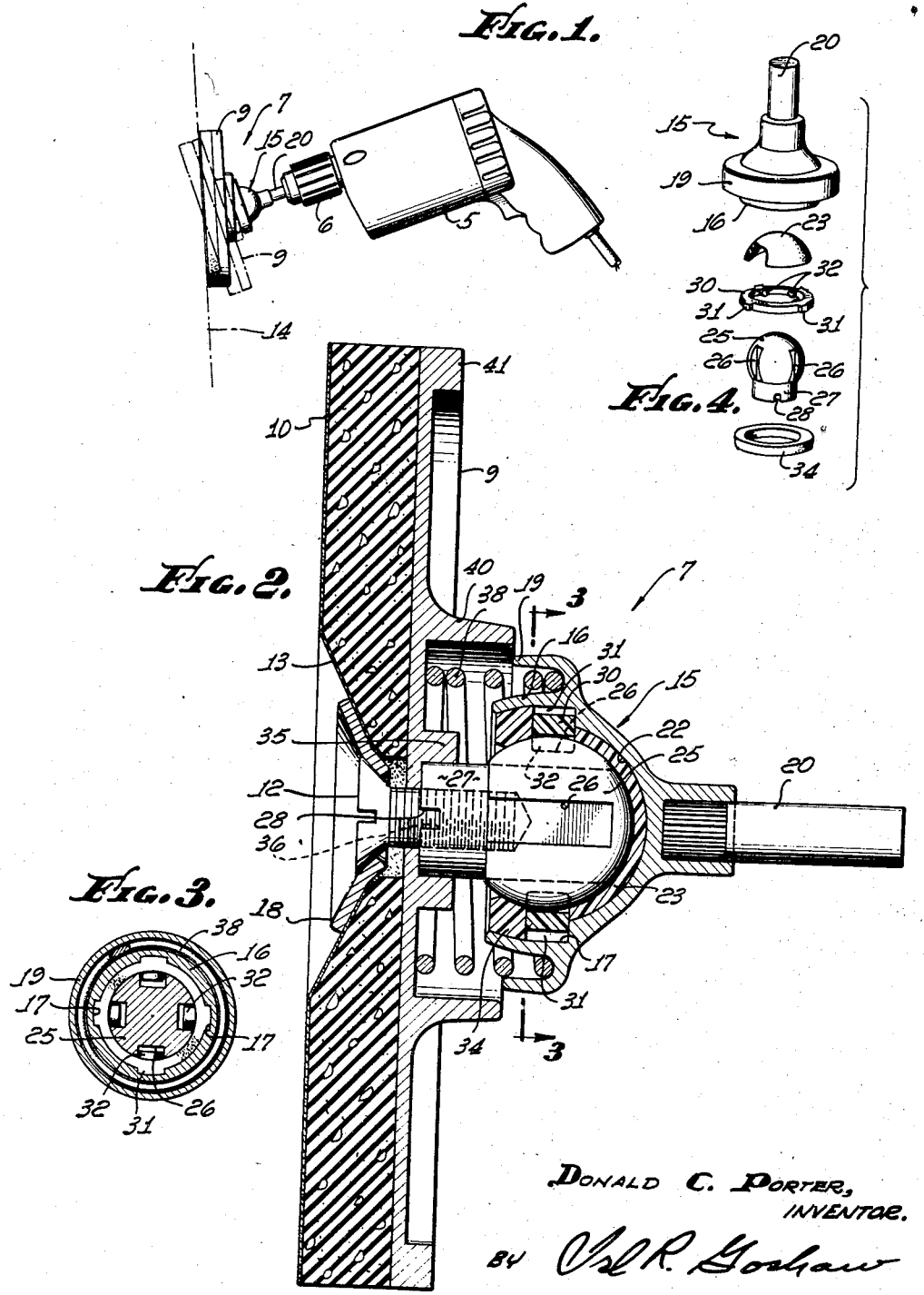
Donald C. Porter,
INVENTOR.
BY
ATTORNEY.

United States Patent Office 2,854,829
Patented Oct. 7, 1958

2,854,829

UNIVERSAL JOINT

Donald C. Porter, Arcadia, Calif., assignor to Warren E. Swarthout, Arcadia, Calif.

Application July 15, 1957, Serial No. 672,029

9 Claims. (Cl. 64—7)

This invention relates to motion transmitting devices and particularly to a ball-and-socket or universal joint mechanism.

Ball-and-socket or universal joints are well known for transmitting power from one element to another. The present invention is directed to a universal joint which is particularly suitable for transmitting rotary motion from a hand-held motor to a rotatable work load, such as a sander, buffer, or the like.

In copending Swarthout application, Serial No. 620,711, filed November 6, 1956, which has common ownership with the present application, a power-driven hand-operated sander or buffer is disclosed and claimed. In this pending application, a certain type of ball-and-socket or universal joint is used. The present invention is particularly suitable for this type of hand-operated power unit and has several advantages over prior universal joints, such as the desired rigidity and flexibility to permit providing a certain better functioning of the unit.

Instead of the pin-type of joint, such as shown in the above-mentioned copending application, and in Patent No. 2,687,024 of August 24, 1954, and Patent No. 1,407,617 of February 21, 1922, this invention utilizes a slotted ball with a plastic cup seat, a driving ring and a retainer ring also made of plastic, while the other elements of the joint are of metal. Another feature is the resilient mounting in the form of a coil spring which has a diameter considerably greater than the ball to permit the ball to remain fixed in its socket, thus providing better control of the rotating load.

The principal object of the invention, therefore, is to facilitate the transmission of rotary power between two elements adapted to vary in angular relationship.

Another object of the invention is to provide an improved ball-and-socket or universal joint.

A further object of the invention is to provide a universal joint for connecting a hand-operated power unit with a rotatable work load, such as a sander, buffer, or the like.

A better understanding of this invention may be had from the following detailed description when read in connection with the accompanying drawings, in which:

Fig. 1 is an elevational view of the invention incorporated in a hand-operated power sander.

Fig. 2 is a cross-sectional view of the invention utilized in Fig. 1.

Fig. 3 is a cross-sectional view of the invention taken along the line 3—3 of Fig. 2; and Fig. 4 is an exploded view showing the separate elements of the invention in perspective.

Referring, now, to the drawings, in which the same reference numerals identify the same elements, a hand drill motor 5 has its chuck 6 conected to a universal joint shown generally at 7. The joint 7 is shown connected to a disc 9 having a sandpaper sheet 10 held thereon by a screw 12 and washer 18 in a recessed portion 13 of the disc 9. It is noted that the surface of the work 14 is parallel to the sheet 10 which is at an angle to the axis of the chuck 6.

The joint itself includes a socket 15 having a rim 16 in which are notches or slots 17. Another outer rim 19 is also provided on the socket, the socket having a shaft 20 for conection to the chuck 6, such as shown in Fig. 1. The socket 15 has an internal spherical portion 22 in which is a plastic cup 23, a suitable plastic being nylon. Positioned in the cup 23 is the spherical portion of a ball 25 having slots 26 therein. The ball has a cylindrical portion 27 which is transversely slotted, as shown at 28, and has a threaded bore. After the spherical portion of the ball is placed in the cup 23, a driving ring 30, which may also be of plastic, is placed in the socket with the projection 31 of the ring accommodated in the notches or slots 17 of the socket. The ring 30 also has internal projections 32 which are fitted in the slots 26 of the ball 25. In this manner, any rotation of the socket 15 will be transmitted to the ball through the projections and slots just mentioned. To maintain the elements just described in position, a plastic retainer ring 34 is press-fitted into the rim 16 of the socket.

The disc 9 has an inner anular rim 35 on which are two diametrically positioned projections, one of which is shown at 36. These projections are fitted in the slot 28 of the ball 25, and the screw 12 is then threaded into the tapped hole in the cylindrical portion 27 of the ball 25. Before the disc 9 is attached to the ball, a coil spring 38 is fitted in the recess between the rims 16 and 19 of the socket and between the rims 35 and 40 of the disc 9, the disc having an outer rim 41 for increased rigidity.

The above type of universal joint has been found particularly suitable for transmitting rotary power in a hand-operated tool, such as a sander or buffer. Since the cup, driving ring, and retainer ring are made of plastic and operate against metal, operation is quiet, very little friction is encountered, and the type of plastic mentioned above is highly resistant to wear. Furthermore, with the large spring 38 bearing at points considerably spaced from the center of rotation of the ball, better hand control of the disc is obtained. That is, a uniform pressure is always obtained between each point on the surface of the paper or buffer and each point on the surface of the material being worked upon at any angle within the limits of the joint.

I claim:

1. A universal joint comprising a socket having internal slots therein and an annular groove, a cup member having a spherical configuration in socket, a ball having slots therein and adapted to contact said cup, a driving ring having external projections in said internal slots of said socket and internal projections in said slots in said ball, a retainer ring in contact with said driving ring and said socket, means attachable to said ball, and resilient means in said groove of said socket and in contact with said last-mentioned means.

2. A universal joint in accordance with claim 1 in which said cup member and said driving ring are of plastic.

3. A universal joint in accordance with claim 1 in which means are provided on said socket for connection to a power element for rotating said socket.

4. A universal joint for connecting a rotatable power element with a work element to be rotated comprising a socket attachable to said power element, said socket having a partial spherical internal portion with slots and an outer annular groove, a spherical-shaped cup accommodated in said spherical internal portion of said cup, a ball having a cylindrical portion and slots parallel with the axis of said cylindrical portion, a driving ring having external projections in said slots of said socket and internal projections in said slots of said ball, and a retainer ring for said cup, said ball and said driving ring, said work element being connectable to said cylindrical portion of said ball.

5. A universal joint in accordance with claim 4 in which a resilient element is provided between said work element and said socket and positioned in said groove of said socket.

6. A universal joint in accordance with claim 5 in which said resilient element is a coil spring, said cup and rings are of plastic and said socket and ball are of metal.

7. A ball-and-socket joint comprising a socket having an annular groove on the outer rim thereof, a ball for said socket, said socket and ball having slots therein parallel with the axis of said socket, a bearing cup between said ball and socket, a driving ring having internal and external projections positioned in said slots of said socket and ball, an element connected to said ball, and resilient means in said groove and in contact with said element.

8. A ball-and-socket joint in accordance with claim 7 in which said cup and driving ring are of plastic and said ball and socket are of metal.

9. A ball-and-socket joint in accordance with claim 7 in which said resilient means is a coil spring having one end in said groove.

References Cited in the file of this patent

UNITED STATES PATENTS

| 1,145,401 | Bowen | July 6, 1915 |
| 1,556,719 | Robinson | Oct. 13, 1925 |
| 2,487,485 | Smiley | Nov. 8, 1949 |

FOREIGN PATENTS

| 346,879 | Italy | Mar. 9, 1937 |